(12) United States Patent
Falvo

(10) Patent No.: US 6,995,751 B2
(45) Date of Patent: Feb. 7, 2006

(54) METHOD AND APPARATUS FOR NAVIGATING AN IMAGE USING A TOUCHSCREEN

(75) Inventor: Barry P. Falvo, Norristown, PA (US)

(73) Assignee: General Instrument Corporation, Horsham, PA (US)

(*) Notice: Subject to any disclaimer, the term of this patent is extended or adjusted under 35 U.S.C. 154(b) by 177 days.

(21) Appl. No.: 10/134,158

(22) Filed: Apr. 26, 2002

(65) Prior Publication Data
US 2003/0201984 A1 Oct. 30, 2003

(51) Int. Cl.
G09G 5/00 (2006.01)

(52) U.S. Cl. .................................. 345/173; 345/158
(58) Field of Classification Search ............... 345/173, 345/156, 167, 174–179, 700–750; 348/211.1–211.8
See application file for complete search history.

(56) References Cited

U.S. PATENT DOCUMENTS

| | | | |
|---|---|---|---|
| 4,959,810 A | | 9/1990 | Darbee et al. |
| 5,282,028 A | | 1/1994 | Johnson et al. |
| 5,406,558 A | | 4/1995 | Rovira et al. |
| 5,410,326 A | * | 4/1995 | Goldstein ............ 348/734 |
| 5,621,456 A | * | 4/1997 | Florin et al. ............ 725/43 |
| 6,002,450 A | | 12/1999 | Darbee et al. |
| 6,025,837 A | | 2/2000 | Matthews, III et al. |
| 6,130,726 A | | 10/2000 | Darbee et al. |
| 6,154,204 A | | 11/2000 | Thompson et al. |
| 6,437,836 B1 | * | 8/2002 | Huang et al. ............ 348/734 |

FOREIGN PATENT DOCUMENTS

| | | |
|---|---|---|
| EP | 675426 A1 | 10/1995 |
| WO | WO 01/78054 A1 | 10/2001 |
| WO | WO 01/91458 A2 | 11/2001 |
| WO | WO 02/32138 A1 | 4/2002 |

OTHER PUBLICATIONS

PCT International Search Report for PCT/US03/12916, date of missing: Aug. 30, 2004, 7 pages.

* cited by examiner

Primary Examiner—Sumati Lefkowitz
Assistant Examiner—Aaron S. Ward
(74) Attorney, Agent, or Firm—Akin Gump Strauss Hauer & Feld, LLP

(57) ABSTRACT

A method and apparatus for navigating an image viewed on a display screen. The image is controlled by a processor that receives navigational commands selected on a touchscreen of an auxiliary display device. The touchscreen is partitioned into a plurality of navigational control areas. Each navigational control area is associated with a different navigational command. When one of the navigational control areas of the touchscreen is selected, the navigational command associated with the selected navigational control area is transmitted to the processor. The processor receives and executes the transmitted navigational command to navigate the image. The boundaries of the control areas are normally hidden from view, but can be revealed on the touchscreen in response to a user input.

32 Claims, 5 Drawing Sheets

METHOD AND APPARATUS FOR NAVIGATING AN IMAGE USING A TOUCHSCREEN

BACKGROUND OF THE INVENTION

1. Field of the Invention

The present invention generally relates to navigating an image viewed on a display screen using a touchscreen.

2. Background Information

A new era in TV viewing experience is emerging in which video complementary data services are available to the TV viewer using a second display screen on an auxiliary display device. One example of an auxiliary display device is a webpad, which is a relatively small remote wireless device.

FIG. 1 shows a conventional two-screen digital cable TV system 100. The system 100 includes an auxiliary display device 105 which communicates with a digital set-top box (STB) 110 (also referred to as a "local device") using a wireless connection. The wireless connection utilizes an external port 115 on the STB 110, such as a Universal serial bus (USB), Ethernet, or IEEE 1394 port equipped with an access point 120 that communicates with the auxiliary display device 105 over a wireless radio frequency (RF) link 125. The access point 120 in this scenario is a device designed for a specific interface (e.g., USB) and is used to support wireless connectivity. The auxiliary display device 105 may also be connected directly to a high-speed cable modem, digital subscriber (DSL) modem or any other high-speed Internet connection device to access the Internet 135. TV video programming 140 is accessible via STB 110. Typical wireless connection protocols that may be used by TV system 100 include, but are not limited to, HomeRF® and IEEE 802.11. A more traditional wired connection simply includes a cable or wire between the STB 110 and the auxiliary display device 105, again using a USB, Ethernet, or IEEE 1394 port. The STB 110 is also connected to a television 130.

The two-screen digital cable TV system 100 allows for many enhanced capabilities over a one-screen system. For example, a user can view Internet data on the screen of the auxiliary display device 105, while watching video uninterrupted on the television 130. In another example, STB applications that are normally viewed on the television screen, are viewed on the screen of the auxiliary display device 105, leaving the television 130 available for video program viewing.

In a CATV system, an electronic program guide (EPG) is a specific example of an application that can be interacted with through an application running on a second screen device, such as auxiliary display device 105. An EPG is used by a viewer to determine what programs are available for viewing on a television, at what time the programs will be broadcast, and on which channels. More sophisticated EPGs display supplemental information used by the viewer to determine whether the program is suitable for young children, what actors are in the program, how long the program is, and what the program is about. Normally in an EPG, an individual windowed portion is allocated for each program displayed. Viewers of CATV programs use a GUI to navigate an EPG and select program windows in the EPG that are of particular interest.

U.S. Pat. No. 6,130,726 (Darbee et al.) discloses a remote control display unit which selects programming shown on a television and displays images on a visual display. The remote control display unit disclosed in U.S. Pat. No. 6,130,726 includes an EZ NAV key used to navigate an EPG by moving up, down, left and right. U.S. Pat. No. 6,130,726 does not disclose using navigational control areas on a touchscreen to navigate an image.

Furthermore, many operating systems use scrollbars displayed on the X and/or Y axis margins of a display screen to allow an image on the screen to be navigated. Scrollbars take up a significant portion of the display that could be used to display a larger and less distracting view of the image.

Thus, it is desirable to navigate an image (e.g., EPG, game) displayed on a display of an auxiliary display device without using space consuming scrollbars or physical control devices such as a joystick, mouse, keys, or the like.

SUMMARY OF THE INVENTION

The present invention is a method and apparatus for navigating an image viewed on a display screen. The image is controlled by a processor that receives navigational commands selected on a touchscreen of an auxiliary display device. The touchscreen is partitioned into a plurality of navigational control areas. Each navigational control area is associated with a different navigational command. One of the navigational control areas is selected. The navigational command associated with the selected navigational control area is transmitted to the processor. The processor receives and executes the transmitted navigational command to navigate the image.

The image may have a plurality of selectable image portions. At least one of the selectable image portions may be currently highlighted for possible selection.

A center circular portion of the touchscreen may be defined and divided into four central navigational control areas and at least one entry control area. Four corner navigational control areas of the touchscreen may be defined. Each corner navigational control area may be adjacent to the center circular portion and located in a respective corner of the touchscreen.

Each of the navigational commands associated with the four corner navigational control areas may be used to change the x-axis and y-axis coordinates of the position of the at least one of the selectable image portions. Each of the navigational commands associated with the four central navigational control areas may be used to change one of the x-axis and y-axis coordinates of the position of the at least one of the selectable image portions. Each navigational control area may be associated with a different navigational command that changes the image portion that is highlighted from the currently highlighted image portion to a image portion adjacent to the currently highlighted image portion when the different navigational command is executed by the processor.

The partitions of the touchscreen may further include at least one entry control area. The entry control area may be selected to activate a function associated with the currently highlighted selectable image portion.

The boundaries of the control areas may be hidden from view and may be revealed on the touchscreen in response to a user input. Either a stylus or a finger of a user may be pressed against the touchscreen to select the one navigational control area. The image may include a television program grid of an electronic program guide (EPG) including a plurality of adjacent program windows. The selection of the one navigational control area may cause a specific program window adjacent to a previously highlighted program window to be highlighted for possible selection in accordance with the executed navigational command. The image may be navigated to play a game.

The apparatus includes the partitioned touchscreen and a transmitter for transmitting the navigational command associated with the selected navigational control area to the processor. The apparatus may be an infrared (IR) consumer electronic device. The processor may be located in a set-top box (STB) and the display screen may be a television in communication with the STB.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings:

FIGS. 4–6, taken together, show an example of how an image viewed on a display screen is navigated in accordance with the present invention.

DETAILED DESCRIPTION OF THE INVENTION

Figure 1:
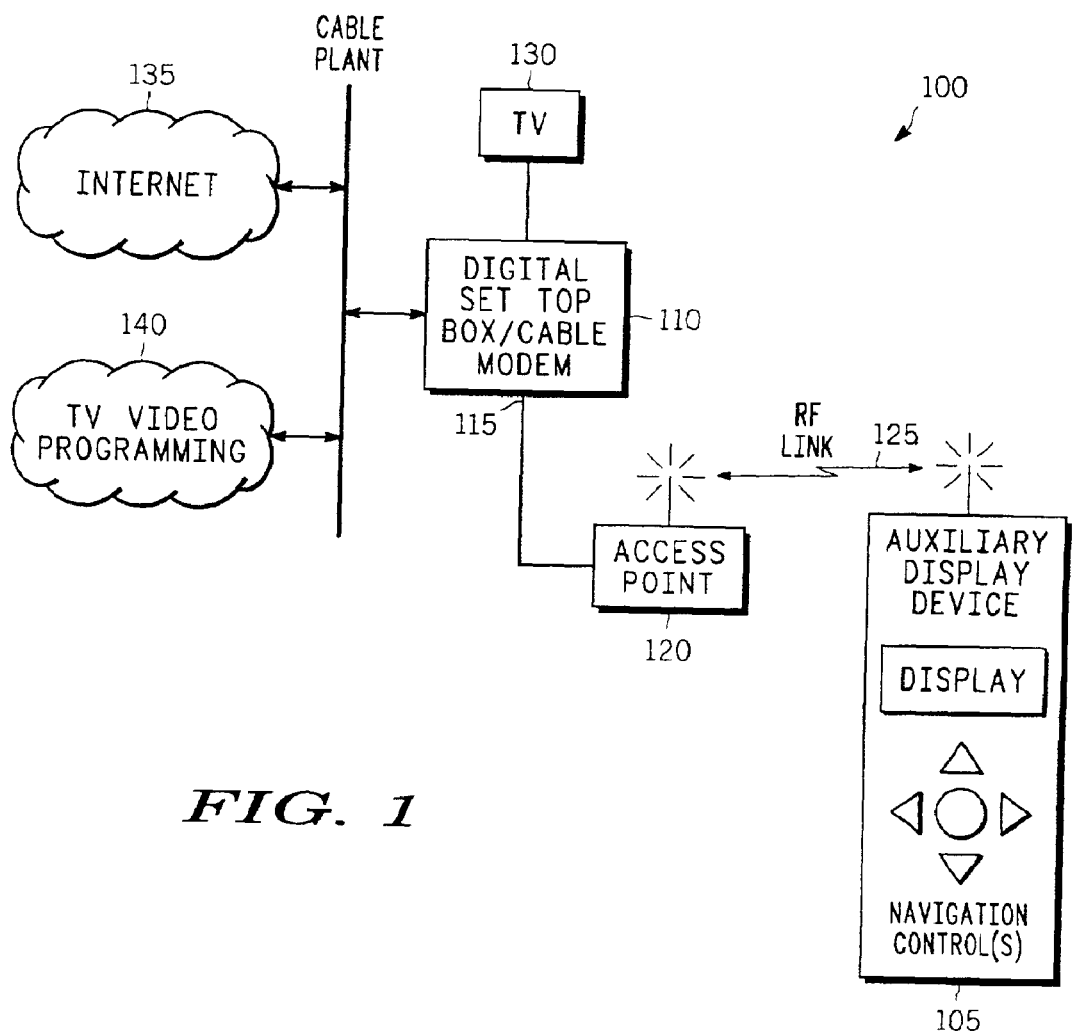
FIG. 1 shows a conventional two-screen digital cable TV system.
Figure 2:
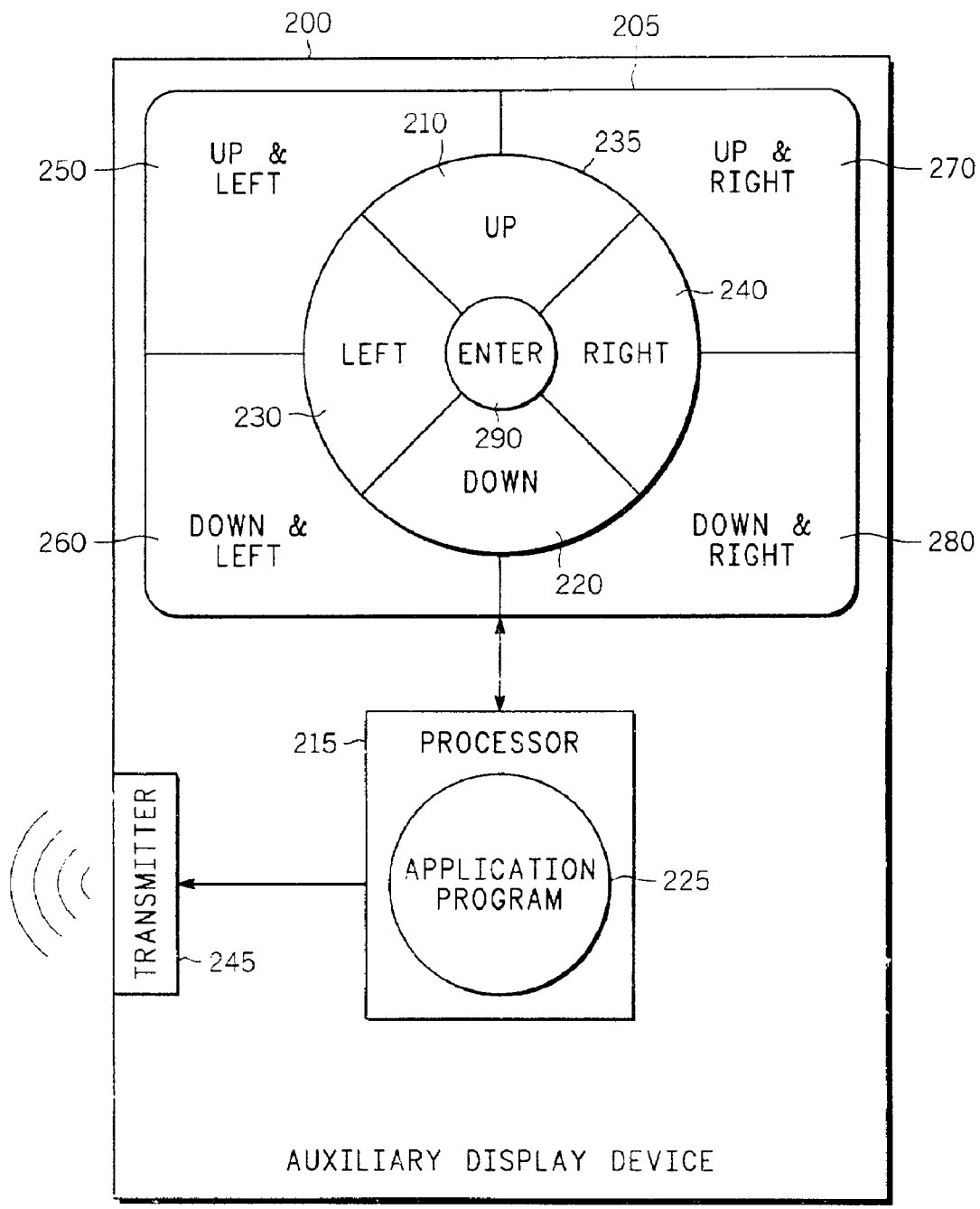
FIG. 2 shows a graphical user interface on the display of an auxiliary display device in accordance with the present invention.

FIG. 2 shows an auxiliary display device 200 operating in accordance with a preferred embodiment of the present invention. The auxiliary display device 200 includes a touchscreen (touch screen) 205, a processor 215, an application program 225 running on the processor 215, and a transmitter 245. The auxiliary display device 200 is used for navigating an image viewed on a display screen.

A basic touchscreen has three components, a sensor, a controller, and a driver. A touchscreen sensor is a clear panel that fits over the display of the auxiliary display device. A software driver allows the touchscreen to interface with an operating system by translating touch events detected by the touchscreen sensor into navigational commands. A touchscreen controller processes signals received from the touchscreen sensor. Several types of touchscreen technologies are presently used:

1. Resistive;
2. Surface acoustic wave; and
3. Capacitive.

A resistive touchscreen consists of glass or acrylic panel that is coated with electrically conductive and resistive layers. The thin layers are separated by invisible separator dots. When operating, an electrical current moves through the touchscreen. When pressure is applied to the screen by a finger or stylus, the layers are pressed together, causing a change in the electrical current and a touch event to be registered.

Surface acoustic wave technology is based on sending acoustic waves across a clear glass panel with a series of transducers and reflectors. When a finger or stylus touches the screen, the waves are absorbed, causing a touch event to be registered.

A capacitive touchscreen consists of a glass panel with a capacitive (charge storing) material coating its surface. Circuits located at corners of the screen measure the capacitance of a person touching the screen. Frequency changes are measured to determine the X and Y coordinates of the touch event.

The application program 225 partitions the touchscreen 205 into a plurality of navigational control areas 210, 220, 230, 240, 250, 260, 270, 280 and at least one entry control area 290. Each navigational area is associated with a different navigational command. Navigational control area 210 is associated with an "up" navigational command. Navigational control area 220 is associated with a "down" navigational command. Navigational control area 230 is associated with a "left" navigational command. Navigational control area 240 is associated with an "right" navigational command. Navigational control area 250 is associated with an "up & left" navigational command. Navigational control area 260 is associated with a "down & left" navigational command. Navigational control area 270 is associated with an "up & right" navigational command. Navigational control area 280 is associated with a "down & right" navigational command. A stylus or a user's finger is pressed against the touchscreen 205 to select different navigational control areas, even while an application unrelated to the image to be navigated is currently displayed on the touchscreen 205. The touchscreen 205 does not display the image that is being navigated.

Figure 3:
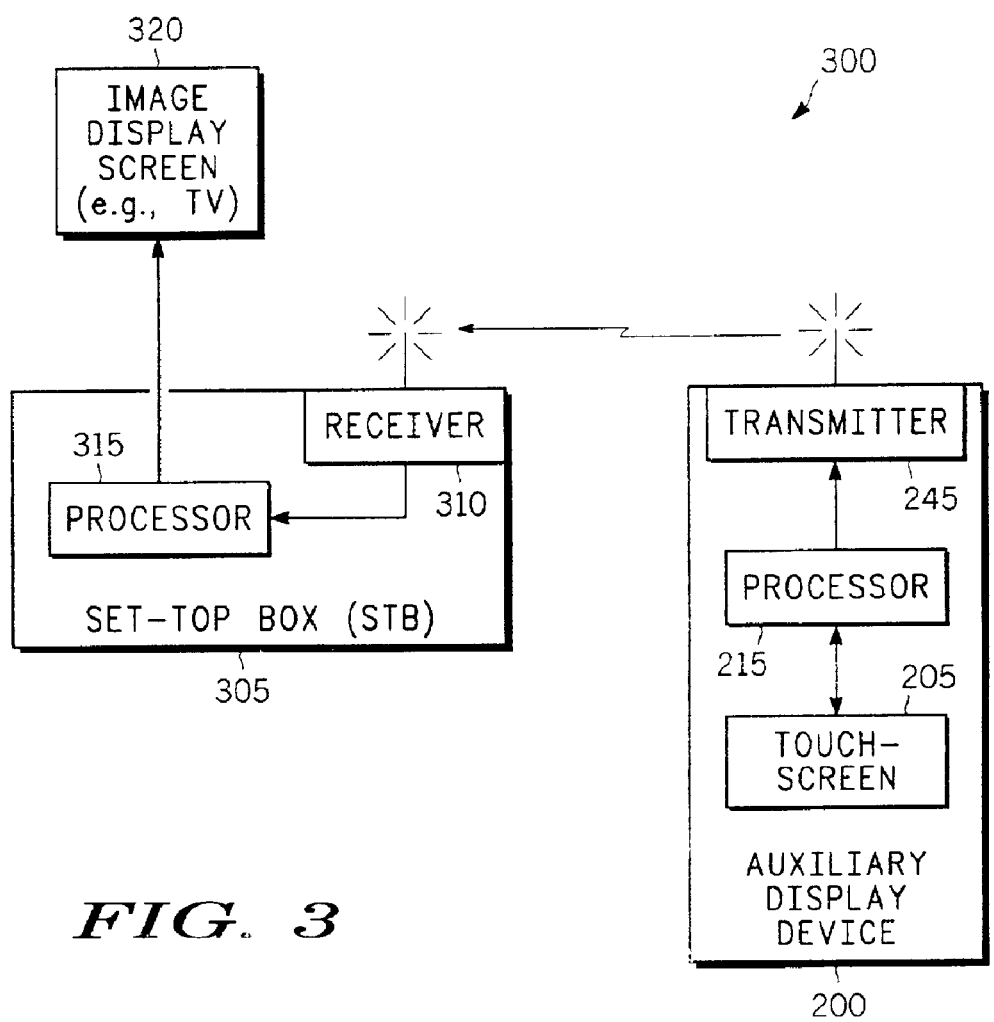
FIG. 3 shows a system for selecting and processing commands used to navigate an image viewed on a display screen in accordance with the present invention.

FIG. 3 shows an example of a system 300 that implements the present invention. The system 300 includes the auxiliary display device 200, a display control device (e.g., set-top box (STB)) 305 and an image display screen 320 (e.g., a television). Display control device 305 includes a receiver 310 and a processor 315. The processor 315 receives navigational commands from the auxiliary display device 200 and controls an image viewed on the display screen 320. When a user selects a navigational control area on touchscreen 205, a navigational command associated with the selected navigational control area is generated or retrieved from a memory (not shown) by processor 215 and forwarded to transmitter 245 for transmission over either a wired or wireless medium. Receiver 310 in display control device 305 receives the transmitted navigational command and forwards the command to the processor 315 in STB. The processor receives and executes the transmitted navigational command navigates the image accordingly.

Figures 4, 5, 6:
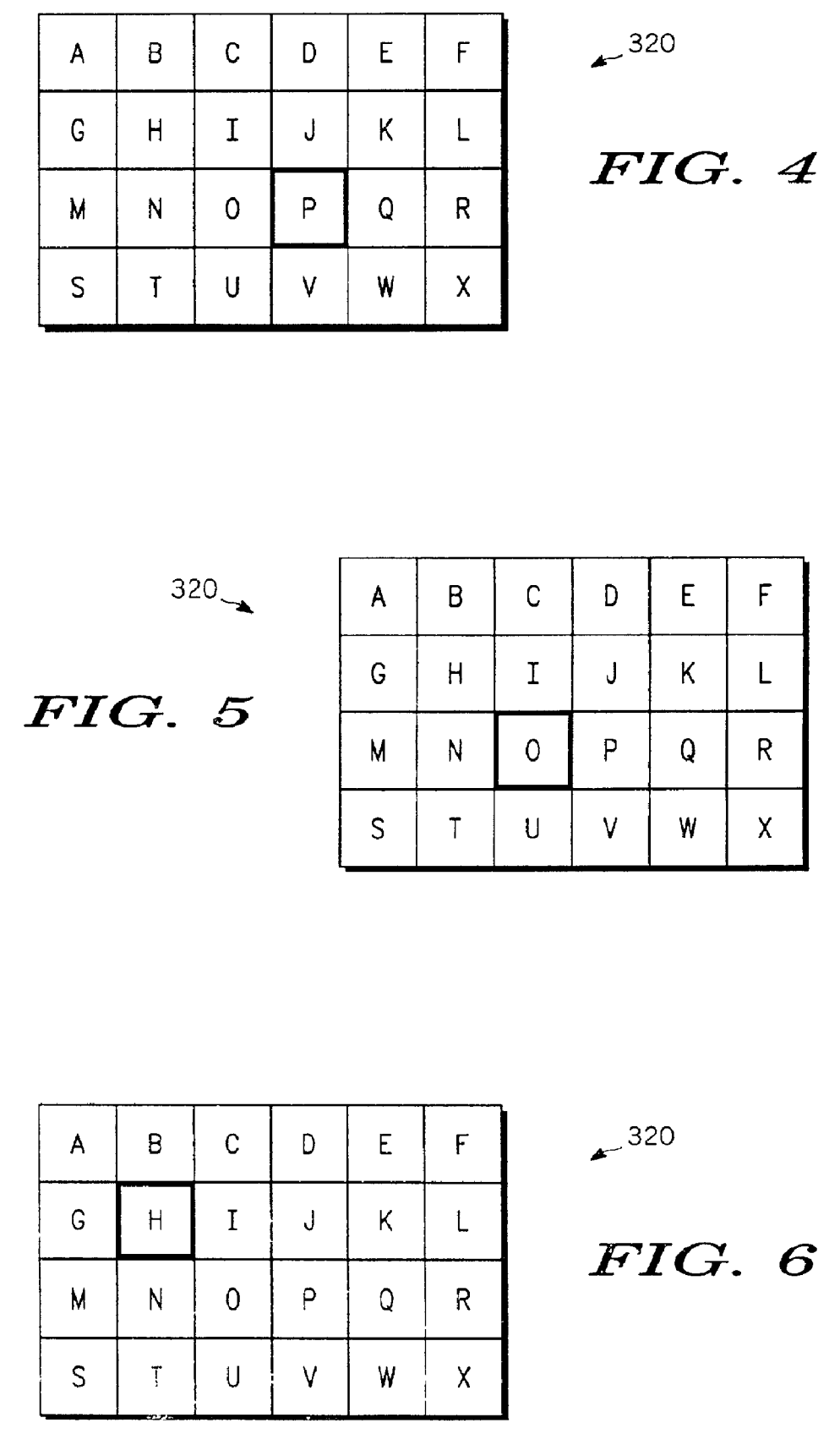

In one embodiment, as shown in FIGS. 4–6, the image has a plurality of selectable image portions. At least one of the selectable image portions is currently highlighted for possible selection by the user of the auxiliary display device 200. The user can activate a function associated with the currently highlighted selectable image portion by selecting the at least one entry control area 290 (see FIG. 2). The particular navigational command associated with the selected control area is executed to change the selected portion from a currently selected portion displayed at a first location on the display screen 320 to a different selected portion displayed at a second location on the display screen 320 according to the executed command.

In one preferred embodiment, a selected navigational command is translated into a wireless signal and is transmitted via transmitter 245 to the display control device 305 for controlling which portion of the image viewed on the image display screen 320 is selected When a user selects one of the defined control areas 210, 220, 230, 240, 250, 260, 270, 280 on the touchscreen 205 of the auxiliary display device 200 by a stylus- or finger-initiated touch in that area, one or more navigational command signals are transmitted to the set-top box display control device. The signals can take the form of infrared (IR) or wireless radio frequency (RF) signals. Alternatively, navigational command signals can be transmitted over a wired interface using typical wired protocols, such as Ethernet, USB, 1394, or the like.

The image viewed on display screen 320 can include a television program grid of an electronic program guide (EPG) including a plurality of adjacent program windows A–X, which correspond to a particular channel and/or time slot during which programming is to commence. The selection of the one navigating control area on touchscreen 205 causes a particular program window adjacent to a previously selected window to be selected in accordance with the executed command.

FIG. 4 shows an example of navigating a program grid viewed on image display screen 320 using the present invention, where program window P is currently highlighted for possible future selection. If navigational control area 230 (Left) is selected, program window O is highlighted instead of program window P, as shown in FIG. 5. Then, as shown in FIG. 6, if navigational control area 250 (Up & Left) is selected, program window H is highlighted instead of program window O. If entry control area 290 is selected while window H is highlighted, a function associated with window H, such as a hyperlink or a second window, is activated when processor 315 in the display control device 305 receives and executes a corresponding entry command from auxiliary display device 200.

A currently displayed program grid may show only a portion of the total program grid, such as only a three-hour time window or only a portion of the available channels. If so, then additional portions of the program grid may be revealed if a user reaches an edge of the currently displayed program grid and selects a navigational control area that would go past the edge. Such a selection is ignored if the currently displayed program grid shows the total program grid.

When the user wants to implement a combination move by selecting one of navigational control areas 250, 260, 270, 280, the application 225 running on processor 215 in the auxiliary display device 200 causes two sequential commands to be transmitted from the auxiliary display device 200 to the display control device 305, just as if a user individually selected two of navigational control areas 210, 220, 230, 240 in sequence. Alternatively, a single "combination" command can be transmitted.

The image viewed on the display screen 320 can also be navigated to play a game (e.g., Pac-Man™, Space Invaders™, or the like) by moving game pieces or other images in the same fashion as described above.

In other preferred embodiments of the present invention, the navigational control areas may be used to cause an action or function to occur with respect to whatever application is currently executing on the STB 305 and being shown on the display screen 320. Each application may have a different set of actions or functions that occur with respect to particular navigation commands. In some applications, such as the EPG application described above, selection of a navigation control area causes a navigation function to occur (e.g., selection of the left navigation control area 230 causes a movement to the left, selection of the down navigation control area 220 causes a downward movement). However, in another application, selection of a navigation control area may not necessarily cause a navigation function to occur. For example, the navigation control areas may cause different actions or functions to occur, such as mode changes or item selections. A mode change or item selection may not necessarily cause the movement of anything on a display screen. The scope of the present invention includes such alternative embodiments.

Figure 7:
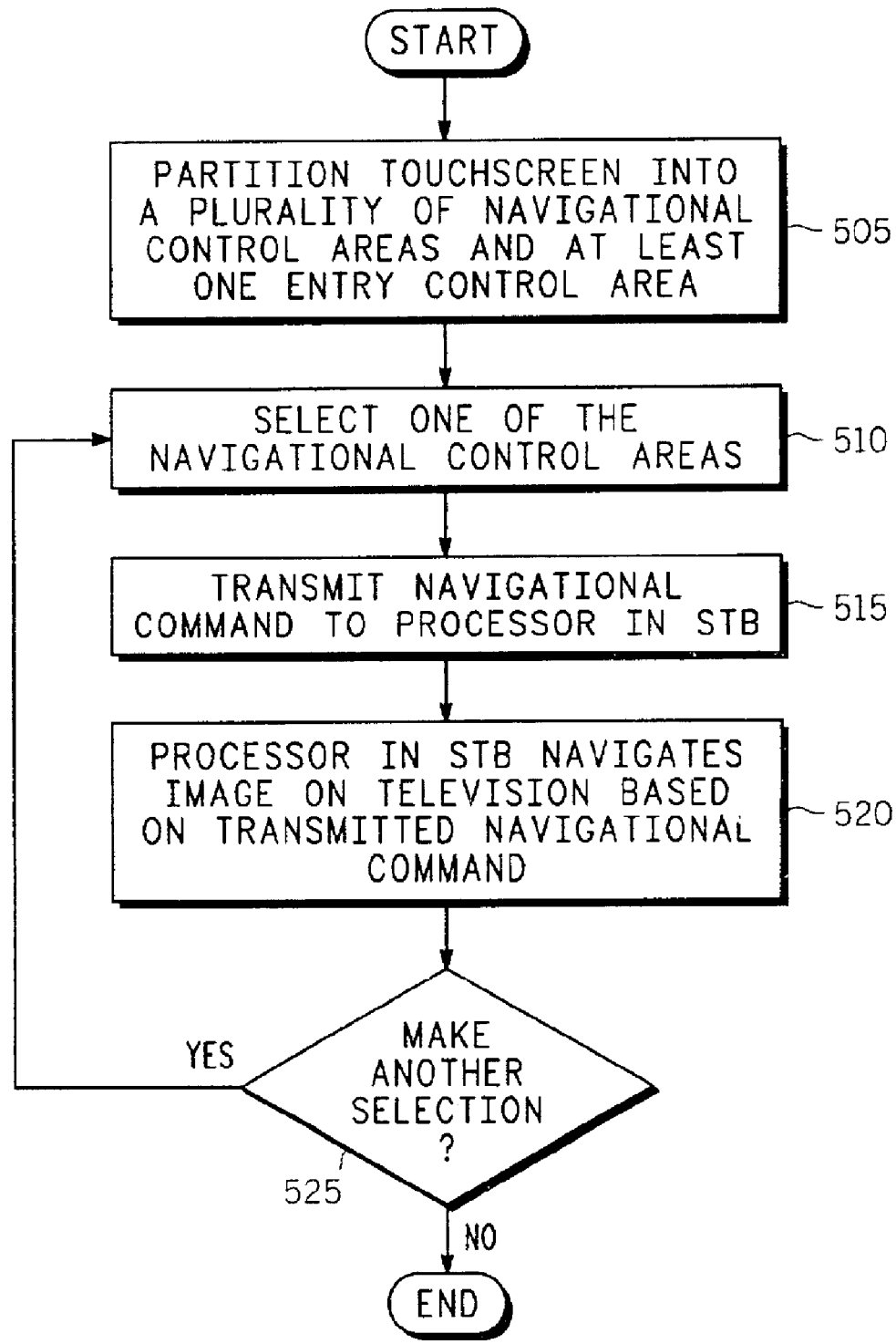
FIG. 7 shows a high-level functional flowchart including steps implemented by the apparatus shown in FIGS. 2 and 3.

FIG. 7 shows a flow chart including steps for navigating an image shown on display screen 320 using an auxiliary display device 200. An application 225 is run on a processor 215 within the auxiliary display device 200 which partitions the touchscreen 205 into a plurality of navigational control areas 210, 220, 230, 240, 250, 260, 270 and 280 and at least one entry control area 290 (step 505). Each navigational control area 210, 220, 230, 240, 250, 260, 270, 280 is associated with a particular navigational command that changes the selection of a portion of an image viewed on the display screen 320. One of the navigational control areas is selected (step 510). The particular navigational command associated with the selected control area is transmitted from the auxiliary display device 200 to the processor 315 in STB 310 (step 515). In step 520, the processor 310 in display control device 305 navigates an image viewed on display screen 320 based on the transmitted navigational command. Each time another one of the navigational control areas is selected (step 525), steps 510, 515 and 520 are repeated.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of navigating an image viewed on a display screen, the image being controlled by a processor that receives navigational commands selected on a touchscreen of an auxiliary display device, the method comprising:
   (a) partitioning the entire area of the touchscreen into a navigation region and at least one entry control area;
   (b) partitioning the navigation region of the touchscreen into a plurality of navigational control areas such that the entire navigation region is covered by the plurality of navigational control areas, each navigational control area being associated with a different navigational command;
   (c) selecting one of the navigational control areas;
   (d) transmitting the navigational command associated with the selected navigational control area to the processor; and
   (e) the processor receiving and executing the transmitted navigational command to navigate the image.

2. The method of claim 1 wherein the image has a plurality of selectable image portions, at least one of the selectable image portions being currently highlighted for possible selection.

3. The method of claim 2 wherein each navigational control area is associated with a different navigational command that changes the image portion that is highlighted from the currently highlighted image portion to a image portion adjacent to the currently highlighted image portion when the different navigational command is executed by the processor.

4. The method of claim 2 further comprising:
(f) selecting the at least one entry control area to activate a function associated with the currently highlighted selectable image portion.

5. The method of claim 1 wherein step (b) comprises:
(i) defining a center circular portion of the navigation region; and
(ii) dividing the center circular portion into four central navigational control areas and the at least one entry control area.

6. The method of claim 5 wherein each of the navigational commands associated with the four central navigational control areas is used to change one of the x-axis and y-axis coordinates of the position of the at least one of the selectable image portions.

7. The method of claim 5 wherein step (b) further comprises:
(iii) defining four corner navigational control areas of the navigation region, each corner navigational control area being adjacent to the center circular portion and located in a respective corner of the navigation region.

8. The method of claim 7 wherein each of the navigational commands associated with the four corner navigational control areas is used to change the x-axis and y-axis coordinates of the position of the at least one of the selectable image portions.

9. The method of claim 1 wherein step (b) comprises:
(i) defining a center circular portion of the navigation region;
(ii) dividing the center circular portion into four central navigational control areas and the at least one entry control area; and
(iii) defining four corner navigational control areas, each corner navigational control area being adjacent to the center circular portion and located in a respective corner of the navigation region.

10. The method of claim 1 wherein step (c) is performed by pressing a stylus against the touchscreen.

11. The method of claim 1 wherein step (c) is performed by pressing a finger of a user of the auxiliary display device against the touchscreen.

12. The method of claim 1 wherein the image includes a television program grid of an electronic program guide (EPG) including a plurality of adjacent program windows, and the selection of the one navigational control area causes a specific program window adjacent to a previously highlighted program window to be highlighted for potential selection in accordance with the executed navigational command.

13. The method of claim 1 wherein the image is navigated to play a game.

14. A method of navigating an image viewed on a display screen, the image being controlled by a processor that receives navigational commands selected on a touchscreen of an auxiliary display device, the method comprising:

(a) partitioning the entire area of the touchscreen into a navigation region and at least one entry control area;
(b) partitioning the navigation region of the touchscreen into a plurality of navigational control areas such that the entire navigation region is covered by the plurality of navigational control areas, each navigational control area being associated with a different navigational command, the boundaries of the control areas being hidden from view;
(c) selecting one of the navigational control areas;
(d) transmitting the navigational command associated with the selected navigational control area to the processor; and
(e) the processor receiving and executing the transmitted navigational command to navigate the image.

15. The method of claim 14 wherein the boundaries of the control areas are revealed on the touchscreen in response to a user input.

16. Apparatus for navigating an image viewed on a display screen, the image being controlled by a processor that receives navigational commands from the apparatus, the apparatus comprising:

(a) a touchscreen having its entire area partitioned into a navigation region and at least one entry control area, the navigation region partitioned into a plurality of navigational control areas such that the entire navigation region is covered by the plurality of navigational control areas, each navigational control area being associated with a different navigational command, the touchscreen being used for selecting one of the navigational control areas; and
(b) a transmitter for transmitting the navigational command associated with the selected navigational control area to the processor, wherein the processor receives and executes the transmitted navigational command to navigate the image.

17. The apparatus of claim 16 wherein the image has a plurality of selectable image portions, at least one of the selectable image portions being currently highlighted for possible selection.

18. The apparatus of claim 17 wherein a center circular portion of the navigation region is defined and divided into four central navigational control areas and the at least one entry control area.

19. The apparatus of claim 18 wherein four corner navigational control areas on the navigation region are defined, each corner navigational control area being adjacent to the center circular portion and located in a respective corner of the navigation region.

20. The apparatus of claim 19 wherein each of the navigational commands associated with the four corner navigational control areas is used to change the x-axis and y-axis coordinates of the position of the at least one of the selectable image portions.

21. The apparatus of claim 18 wherein each of the navigational commands associated with the four central navigational control areas is used to change one of the x-axis and y-axis coordinates of the position of the at least one of the selectable image portions.

22. The apparatus of claim 17 wherein each navigational control area is associated with a different navigational command that changes the image portion that is highlighted from the currently highlighted image portion to a image portion adjacent to the currently highlighted image portion when the different navigational command is executed by the processor.

23. The apparatus of claim 17 wherein the at least one entry control area is selected to activate a function associated with the currently highlighted selectable image portion.

24. The apparatus of claim 16 wherein a center circular portion of the navigation region is defined and divided into four central navigational control areas and the at least one entry control area, and four corner navigational control areas of the navigation region are defined, each corner navigational control area being adjacent to the center circular portion and located in a respective corner of the navigation region.

25. The apparatus of claim 16 wherein the one navigational control area is selected by pressing a stylus against the touchscreen.

26. The apparatus of claim 16 wherein the one navigational control area is selected by pressing a finger of a user of the auxiliary display device against the touchscreen.

27. The apparatus of claim 16 wherein the image includes a television program grid of an electronic program guide (EPG) including a plurality of adjacent program windows, and the selection of the one navigational control area causes a specific program window adjacent to a previously highlighted program window to be highlighted for potential selection in accordance with the executed navigational command.

28. The apparatus of claim 16 wherein the image is navigated to play a game.

29. The apparatus of claim 16 wherein the apparatus is an infrared (IR) consumer electronic device.

30. The apparatus of claim 16 wherein the processor is located in a set-top box (STB) and the display screen is a television in communication with the STB.

31. Apparatus for navigating an image viewed on a display screen, the image being controlled by a processor that receives navigational commands from the apparatus, the apparatus comprising:

(a) a touchscreen having its entire area partitioned into a navigation region and at least one entry control area, the navigation region partitioned into a plurality of navigational control areas such that the entire navigation region is covered by the plurality of navigational control areas, each navigational control area being associated with a different navigational command, the boundaries of the control areas being hidden from view, the touchscreen being used for selecting one of the navigational control areas; and (b) a transmitter for transmitting the navigational command associated with the selected navigational control area to the processor, wherein the processor receives and executes the transmitted navigational command to navigate the image.

32. The apparatus of claim 31 wherein the boundaries of the control areas are revealed on the touchscreen in response to a user input.

* * * * *